B. J. RINEBOLD.
ANIMAL POKE.
APPLICATION FILED AUG. 28, 1916.
1,250,017.  Patented Dec. 11, 1917.
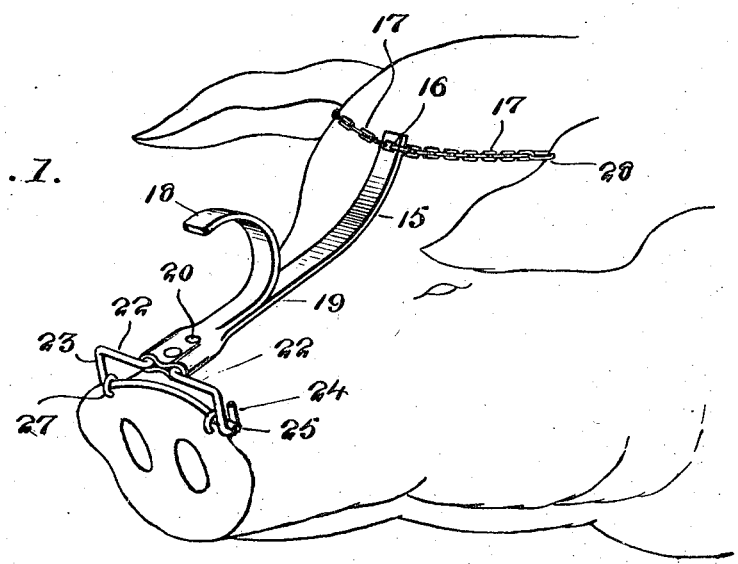
Fig. 1.
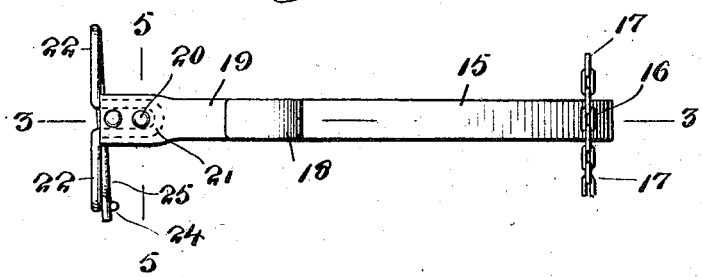
Fig. 2.
Fig. 3.
Fig. 4.
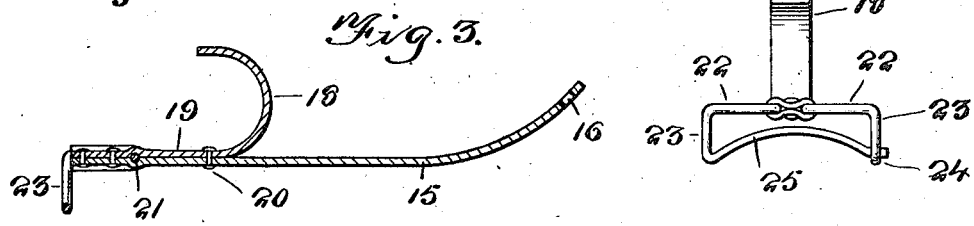
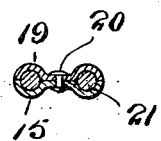
Fig. 5.
Witnesses
E. R. Ruppert
Wm. Bagger
Inventor
B. J. Rinebold
By Victor J. Evans
Attorney

UNITED STATES PATENT OFFICE.

BERT J. RINEBOLD, OF KANSAS, OHIO.

ANIMAL-POKE.

1,250,017.

Specification of Letters Patent. Patented Dec. 11, 1917.

Application filed August 28, 1916. Serial No. 117,352.

*To all whom it may concern:*

Be it known that I, BERT J. RINEBOLD, a citizen of the United States, residing at Kansas, in the county of Seneca and State of Ohio, have invented new and useful Improvements in Animal-Pokes, of which the following is a specification.

This invention relates to animal pokes, and it has particular reference to a device for restraining unruly hogs and for preventing them from burrowing under fences.

The invention has for its object to produce a simple and improved device of the class specified which may be readily attached to the nose and ears of the animal by means of ordinary rings and which will be provided with fence engaging means to prevent the animal from burrowing beneath the fence but which ordinarily will not cause serious pain or discomfort to the animal.

A further object of the invention is to simplify and improve the general construction and arrangement of the parts.

With these and other ends in view which will readily appear as the nature of the invention is better understood, the same consists in the improved construction and novel arrangement and combination of parts which will be hereinafter fully described and particularly pointed out in the claim.

In the accompanying drawing has been illustrated a simple and preferred form of the invention, it being, however, understood that no limitation is necessarily made to the precise structural details therein exhibited, but that changes, alterations and modifications within the scope of the claim may be resorted to when desired.

In the drawing,—

Figure 1 is a perspective view showing the improved device applied in position for operation.

Fig. 2 is a top plan view of the device detached.

Fig. 3 is a longitudinal sectional view taken on the line 3—3 in Fig. 2.

Fig. 4 is a front end view.

Fig. 5 is a transverse sectional view taken on the line 5—5 in Fig. 2.

Corresponding parts in the several figures are denoted by like characters of reference.

The body portion of the improved device consists of a flat bar 15 of iron or other metal, the same having at one end an aperture 16 with which two short chains 17 are connected. 18 designates a hook also formed of a flat metal bar, the shank 19 of said hook being riveted or otherwise secured on the bar 15 at the front end thereof, rivets 20 having been chosen as fastening means for the purpose of illustration. Included between the front ends of the bar 15 of the shank 19 is a U-shaped loop or shank 21, the limbs of which are provided with laterally extending arms 22, each having a downwardly extending bracket 23, and one of said brackets 23 being provided with a terminal hook 24. The other bracket 23 is provided with a laterally extending arcuate spring arm 25 which is terminally supported in the hook 24, said spring arm and related parts being made of stiff, but resilient material, such as moderately heavy steel wire. The spring arm 25 which has been described as being of arcuate form is curved upwardly between its ends.

As will be seen from the foregoing description, the frame member which includes the U-shaped loop 21, the arms 22, the brackets 23 and the spring arm 25 may be firmly connected with the body or member 15 by securing the loop 21 between the body member and the shank 19 of the hook 18. The arms 22, brackets or side members 23 and the spring arm 25 will thus combine to present a substantially rectangular frame positioned at the forward end of the body member 15, said frame including the spring arm 25 which, while normally supported in the hook 24, may be disconnected from said hook when desired.

To attach the improved device to a hog, the nose of the hog is first provided with two rings. The spring arm 25 is then released from the hook 24 and passed through the rings, after which the spring arm is again placed in engagement with the hook 24. The rings, which have been shown at 27 in Fig. 1, owing to the up-curved arcuate form of the spring arm, will become seated near the ends of the latter adjacent to the brackets or side members 23. Rings 28 are now inserted through suitable links of the chains 17 and through the ears of the animal, the chains being of such length that the most convenient and suitable adjustment may be readily effected. When thus secured, the device will be firmly retained on the head of the animal, and the hook 18 will maintain an upstanding position which, if the hog should attempt to root beneath the wire fence, will become engaged with the bottom wire of the fence, thereby preventing the animal from burrowing beneath the fence. The device is light, not cumbersome and will in nowise interfere with the regular feeding of the animal.

Having thus described the invention, what is claimed as new, is:—

A hog poke including a flat bar, a hook member having a flat shank, and a frame of resilient material, said frame including a U-shaped loop having laterally extending arms, downwardly extending brackets one of which has a terminal hook, and a spring arm extending from the other bracket and normally supported in the hook, said U-shaped loop being secured between the flat bar and the flat shank of the first mentioned hook.

In testimony whereof I affix my signature.

BERT J. RINEBOLD.

Copies of this patent may be obtained for five cents each, by addressing the "Commissioner of Patents, Washington, D. C."